(12) United States Patent
Gu et al.

(10) Patent No.: US 10,889,532 B2
(45) Date of Patent: Jan. 12, 2021

(54) GRAPHENE/METAL OR METALLOID CORE-SHELL COMPOSITE AND MANUFACTURING METHOD THEREOF

(71) Applicant: HUBEI INSTITUTE OF AEROSPACE CHEMOTECHNOLOGY, Hubei (CN)

(72) Inventors: Jian Gu, Hubei (CN); Xiaoping Zhang, Hubei (CN); Aimin Pang, Hubei (CN)

(73) Assignee: HUBEI INSTITUTE OF AEROSPACE CHEMOTECHNOLOGY, Hubei (CN)

( * ) Notice: Subject to any disclaimer, the term of this patent is extended or adjusted under 35 U.S.C. 154(b) by 253 days.

(21) Appl. No.: 15/777,371

(22) PCT Filed: Jun. 15, 2016

(86) PCT No.: PCT/CN2016/085785
§ 371 (c)(1),
(2) Date: May 18, 2018

(87) PCT Pub. No.: WO2017/206200
PCT Pub. Date: Dec. 7, 2017

(65) Prior Publication Data
US 2019/0185391 A1 Jun. 20, 2019

(30) Foreign Application Priority Data
May 31, 2016 (CN) .......................... 2016 1 0377771

(51) Int. Cl.
*D03D 23/00* (2006.01)
*D03D 43/00* (2006.01)
(Continued)

(52) U.S. Cl.
CPC ............ *C06B 45/20* (2013.01); *B22F 1/0062* (2013.01); *B22F 1/02* (2013.01); *B22F 1/025* (2013.01);
(Continued)

(58) Field of Classification Search
USPC .................................. 149/2, 3, 108.2, 109.6
See application file for complete search history.

(56) References Cited

U.S. PATENT DOCUMENTS

| 9,017,756 B2 | 4/2015 | Zhamu et al. | |
| 2013/0190449 A1* | 7/2013 | Kinloch | C01B 32/23 |
| | | | 525/50 |

FOREIGN PATENT DOCUMENTS

| CN | 101973518 | 2/2011 |
| CN | 102343239 | 2/2012 |

(Continued)

OTHER PUBLICATIONS

International Search Report for PCT/CN2016/085785 dated Jan. 25, 2017, 8 pages.

*Primary Examiner* — James E McDonough
(74) *Attorney, Agent, or Firm* — Dority & Manning, P.A.

(57) ABSTRACT

The present invention relates to a manufactured graphene/metal or metalloid core-shell composite and manufacturing method thereof. The method comprising: using a modified graphene oxide as a base, then performing concentration and steam drying followed by organic solvent replacement to obtain a modified graphene oxide organic solvent; using a liquid-phase self-assembly method to coat the modified graphene oxide onto a surface of the metal or metalloid to form a graphene/metal or metalloid coated particle solution, then filtering and drying to obtain the graphene metal/metalloid core-shell composite. The method improves upon a conventional organic and inorganic material coating technique, and reduces an impact of a water-based solvent and (Continued)

high temperature on a highly reactive metal and metalloid, thereby expanding the feasibility of the coating technique and addressing a barrier of applicability of graphene and reactive metal or metalloid in the field of energetic materials.

22 Claims, 5 Drawing Sheets (51) Int. Cl.
*C06B 45/20* (2006.01)
*C01G 49/06* (2006.01)
*C01B 6/06* (2006.01)
*C01G 3/02* (2006.01)
*C01B 6/04* (2006.01)
*B22F 1/02* (2006.01)
*C01G 21/06* (2006.01)
*B22F 1/00* (2006.01)
*C06B 23/00* (2006.01)
*B22F 9/24* (2006.01)
*C06B 21/00* (2006.01)
*C06B 45/00* (2006.01)
*C06B 45/18* (2006.01)

(52) U.S. Cl.
CPC .............. *B22F 9/24* (2013.01); *C01B 6/04* (2013.01); *C01B 6/06* (2013.01); *C01G 3/02* (2013.01); *C01G 21/06* (2013.01); *C01G 49/06* (2013.01); *C06B 21/0008* (2013.01); *C06B 21/0033* (2013.01); *C06B 21/083* (2013.01); *C06B 23/007* (2013.01)

(56) References Cited

FOREIGN PATENT DOCUMENTS

| CN | 102351174 | | 2/2012 | |
| CN | 102923693 | | 2/2013 | |
| CN | 103466610 | | 12/2013 | |
| CN | 103706349 | | 4/2014 | |
| CN | 105331109 | | 2/2016 | |
| CN | 105331109 A | * | 2/2016 | ............. C08K 13/06 |
| EP | 2625139 | | 4/2012 | |

* cited by examiner

GRAPHENE/METAL OR METALLOID CORE-SHELL COMPOSITE AND MANUFACTURING METHOD THEREOF

CROSS REFERENCE TO RELATED APPLICATIONS

This application is the U.S. National Stage entry of International Application Number PCT/CN2016/085785, entitled "Graphene/Metal or Metalloid Core-Shell Composite and Manufacturing Method Thereof", filed under the Patent Cooperation Treaty having a filing date of Jun. 15, 2016, which claims priority to Chinese Patent Application No. 2016-40377771.1, filed with the Chinese Patent Office on May 31, 2016, entitled "Graphene/Metal or Metalloid Core-Shell Composite and Manufacturing Method Thereof", which are incorporated herein by reference.

FIELD

The present disclosure relates to a graphene/metal or semi-metal composite material with shell-core structure and preparation method thereof, and belongs to the field of composite material technology.

BACKGROUND

Graphene is a hexagonal honeycomb lattice planar thin film of carbon atoms using $sp^2$ hybrid orbitals. Graphene is a two-dimensional material with only one carbon atom thickness. By "cutting" out different shapes of sheets from graphene, zero-dimensional fullerene can be obtained by warping, a one-dimensional of carbon nanotube of barrel shape can be obtained by crimping, and three-dimensional graphite can be obtained by stacking. Therefore, we believe that graphene is a base unit to construct other carbon materials and is by far the most ideal carbon material. The successful preparation of two-dimensional crystalline materials represented by graphene has opened up a new era in the development of new nano-materials and functional materials/devices.

Graphene oxide has the advantages of simple preparation, low cost, high stability, large specific surface area and porosity, etc., whose chemical activity is higher than graphene. Graphene oxide is an intermediate during the preparation of graphene by chemical oxidation-reduction reaction from graphite. Its structure comprises several to over ten layers of single layer $sp^2$ carbon atoms and a certain amount of oxygen-containing groups (as shown in the following formula), which has some functional properties of graphene. Research reports that graphene oxide solution can be subjected to coating treatment. At present, however, graphene oxide can generally only dissolve in water and its dispersibility in organic solvent is not high. Therefore, functional modifications are needed to realize the dispersion and solubility of graphene oxide in some organic solvents.

At present, the mainly used method of coating metals and metal oxides with graphene is liquid-phase chemical reaction together with high-temperature sintering. Its coating process comprises chemical reactions and the composite material with shell-core structure is mainly produced by crystal precipitation, which requires a relatively strict reaction condition. Usually, the reaction medium is water, and is not suitable for some active metals or active semi-metals. In addition, for metals, intermetallic compounds and metal oxides, the formation of the composite material with shell-core structure also generally requires auxiliary laser heating or high temperature sintering at 800° C. or more, thus the process is complex, the cost is high, the structural stability of some composite material with shell-core structure is relatively poor and the compatibility with solid propellants is neither good.

SUMMARY

The object of the present disclosure is to provide a graphene/metal or semi-metal composite material with shell-core structure. By liquid-phase self-assembly, the modified graphene oxide is coated on the surface of a metal or a semi-metal to form a graphene/metal or semi-metal composite material with shell-core structure, which realizes the chemical coating treatment of some metals or semi-metals with relatively high reaction activity, and maintains the property stability of the metals or semi-metals, solving the application barrier of graphene and active metals (semi-metals) in energetic materials.

Another object of the present disclosure is to provide a method of preparing a graphene/metal or semi-metal composite material with shell-core structure.

The above-mentioned objects of the present disclosure are mainly achieved by the following technical solutions:

A graphene/metal or semi-metal composite material with shell-core structure, its general formula is (R-GO)M, wherein R is a surface functional group, GO is graphene oxide, M is a metal or a semi-metal, the M is the core of the shell-core structure, the R-GO is the shell of the shell-core structure.

In the above-mentioned graphene/metal or semi-metal composite material with shell-core structure, the surface functional group is amine group, hydroxylamine group, acyl group, amide group or epoxy group.

In the above-mentioned graphene/metal or semi-metal composite material with shell-core structure, the metal is Ni, Zn, Al, Mg, Zr, Fe, Ag, Pt or Au.

In the above-mentioned graphene/metal or semi-metal composite material with shell-core structure, the semi-metal is a metal hydride, an intermetallic compound or a metal oxide. The metal hydride is $MgH_2$, $AlH_3$, $Mg(BH_4)_2$ or $LiH$, the intermetallic compound is B—Mg, B—Al, Zr—Al or Al—Mg, and the metal oxide is $Fe_2O_3$, $TiO_2$, $P_2O_3$, $MgO$, $CuO$ or $Al_2O_3$.

A preparation method of a graphene/metal or semi-metal composite material with shell-core structure, comprising the following steps:

1) modifying graphene oxide by introducing a surface functional group to graphene oxide to obtain a modified graphene oxide;
2) dissolving the modified graphene oxide in an organic solvent to obtain an organic solution of the modified graphene oxide;
3) adding a metal or a semi-metal to an organic solvent, stirring until homogeneous, then dropping the organic solution of the modified graphene oxide and reacting to obtain a solution of coated graphene/metal or semi-metal; and
4) removing solvent from the solution of the coated graphene/metal or semi-metal to obtain a graphene/metal or semi-metal composite material with shell-core structure after drying.

In the above-mentioned preparation method of the graphene/metal or semi-metal composite material with shell-core structure, the specific method of modifying graphene oxide in step 1) comprises the following steps:

1.1) subjecting an aqueous solution of graphene oxide to ultrasonic dispersion and stirring homogeneously to obtain a clear solution;
1.2) dropping a modifier into the clear solution of graphene oxide, stirring and refluxing; controlling the reaction temperature, dropping rate and refluxing time to obtain a modified graphene oxide solution; and
1.3) subjecting the modified graphene oxide solution to high speed centrifugation and filtration to obtain a modified graphene oxide product.

In the above-mentioned preparation method of the graphene/metal or semi-metal composite material with shell-core structure, the modified graphene oxide product obtained in step 1.3) is a gel-like product. After the gel-like product is washed, vacuum dried is carried out. The powder of the modified graphene oxide is then obtained, wherein the temperature of the vacuum drying is 60 to 120° C., and the time of the vacuum drying is 5 to 24 h.

In the above-mentioned preparation method of the graphene/metal or semi-metal composite material with shell-core structure, the concentration of the aqueous solution of graphene oxide in step 1.1) is 0.5 to 10 mg/ml.

In the above-mentioned preparation method of the graphene/metal or semi-metal composite material with shell-core structure, the modifier in step 1.2) isethylenediamine, hexamethylenediamine, triethanolamine, diethanolamine, N,N-diethylhydroxylamine, N-acetylpiperidine, N-acetylpiperazine, dimethylformamide, isopentanamide, acetamide, ethylene oxide or propylene oxide.

In the above-mentioned preparation method of the graphene/metal or semi-metal composite material with shell-core structure, the mass ratio of the modifier to graphene oxide is 1:5 to 1:20.

In the above-mentioned preparation method of the graphene/metal or semi-metal composite material with shell-core structure, in step 1.2), the dropping rate is 10 to 80 drops/min, the reaction temperature is 20 to 80° C., and the refluxing time is 1 to 5 h.

In the above-mentioned preparation method of the graphene/metal or semi-metal composite material with shell-core structure, in step 1.3), the time of high speed centrifugation is 5 to 30 min, and the speed of centrifugation is 4000 to 8000 r/min.

In the above-mentioned preparation method of the graphene/metal or semi-metal composite material with shell-core structure, the surface functional group in step 1) is amine group, hydroxyl amine group, acyl group, amide group or epoxy group.

In the above-mentioned preparation method of the graphene/metal or semi-metal composite material with shell-core structure, the organic solvent in step 2) is ethanol, acetone, tetrahydrofuran, ethyl acetate, diethyl ether or dimethylformamide.

In the above-mentioned preparation method of the graphene/metal or semi-metal composite material with shell-core structure, the concentration of the organic solution of modified graphene oxide obtained in step 2) is 0.5 to 10 mg/ml.

In the above-mentioned preparation method of the graphene/metal or semi-metal composite material with shell-core structure, the metal in step 3) is Ni, Zn, Al, Mg, Zr, Fe, Ag, Pt or Au.

In the above-mentioned preparation method of the graphene/metal or semi-metal composite material with shell-core structure, the semi-metal in step 3) is a metal hydride, an intermetallic compound or a metal oxide, wherein the metal hydride is $MgH_2$, $AlH_3$, $Mg(BH_4)_2$ or $LiH$, the intermetallic compound is B—Mg, B—Al, Zr—Al or Al—Mg, and the metal oxide is $Fe_2O_3$, $TiO_2$, $P_2O_3$, $MgO$, $CuO$ or $Al_2O_3$.

In the above-mentioned preparation method of the graphene/metal or semi-metal composite material with shell-core structure, the mass ratio of the metal or semi-metal to the modified graphene oxide is 2000:1 to 100:1.

In the above-mentioned preparation method of the graphene/metal or semi-metal composite material with shell-core structure, the reaction temperature in step 3) is −10° C. to +80° C.

In the above-mentioned preparation method of the graphene/metal or semi-metal composite material with shell-core structure, the dropping rate of the organic solution of the modified graphene oxide in step 3) is 10 drops/min to 100 drops/min.

In the above-mentioned preparation method of the graphene/metal or semi-metal composite material with shell-core structure, the reaction time in step 3) is 1 to 10 h.

In the above-mentioned preparation method of the graphene/metal or semi-metal composite material with shell-core structure, in step 3), the organic solvent added into metal or semi-metal is the same as the organic solvent in the solution of modified graphene oxide.

In the above-mentioned preparation method of the graphene/metal or semi-metal composite material with shell-core structure, suction filtration is adopted in step 4) to remove the solvent in the solution of the coated graphene/metal or semi-metal, and the suction filtration time is 3 to 15 min.

In the above-mentioned preparation method of the graphene/metal or semi-metal composite material with shell-core structure, after step 4) which removes the solvent in the solution of the coated graphene/metal or semi-metal, the product is placed in a vacuum drying oven for vacuum drying; the temperature of the vacuum drying is 10 to 100° C. and the time of the vacuum drying is 0.5 to 10 h.

The present disclosure has the following advantageous effects as compared with the prior art:

1) Liquid-phase self-assembly method is adopted in the present disclosure to coat one or several layers of graphene oxide (GO) onto the surface of a metal or a semi-metal to obtain a graphene coated metal or semi-metal composite material with shell-core structure, which realizes the chemical coating treatment of some metals or semi-metals with high reaction activity, and maintains the property stability of the metals or semi-metals, solving the application barrier of graphene and active metal (semi-metal) in energetic materials.

2) The present disclosure is based on the obtained modified graphene oxide. An organic solution of the modified graphene oxide is first obtained by concentration and evaporating to dryness followed by organic solvent replacement, then the modified graphene oxide is coated onto the surface of a metal or semi-metal by liquid phase in situ preparation to form a solution of a coated graphene/metal or semi-metal. Finally, a graphene/metal or semi-metal composite material with shell-core structure is obtained by filtration and drying. This method improves conventional coating process of organic compounds and inorganic compounds, as well as reduces the influence of water solvent and high temperature on the activity of some highly reactive metals and semi-metals, which extends the process realizability of coating method, and solves the application barrier of graphene and active metals (semi-metals) in energetic materials.

3) The present disclosure is different from conventional coating methods of organic compounds and inorganic compounds, and adopts liquid-phase in situ preparation of modified graphene oxides on the surface of metal or semi-metal materials. The shell-core structure formation process in the method includes two mechanisms: physical reaction and chemical reaction, but there is scarcely any crystal precipitation process. The influence of reaction conditions and process parameters on the formation of the composite material with shell-core structure is thus reduced.

4) By design and preparation of the surface functional group structure of graphene oxide in the present disclosure, a functionally modified graphene oxide which can disperse well in a variety of organic solutions was obtained. The modified graphene oxide can overcome the single function of graphene oxide and perform chemical coating treatments of some metals or semi-metals with relatively high reaction activity, as well as maintain the property stability of the metals or semi-metals.

5) According to the characteristics of the material to be coated, the present disclosure performs coating processes of non-aqueous solvent, reducing the influence of water on the performance of the material to be coated during the coating process.

6) According to the characteristics of the material to be coated, the present disclosure adopts non-stirring low-temperature coating process, ensuring the performance stability of the material to be coated.

7) The coating treatment of the present disclosure significantly improves the thermal stability of metal hydrides and the compatibility with high-energy propellant components.

8) Experiments show that the graphene/metal or semi-metal composite material with shell-core structure of the present disclosure has a low residue rate and obviously improved combustion heat compared with pure metals or semi-metals. When it is used in solid propellants, the actual specific impulse of the solid propellant will be remarkably improved and the burning rate of the solid propellant also increases.

9) Experiments show that both the friction sensitivity and impact sensitivity of the graphene/metal or semi-metal composite material with shell-core structure of the present disclosure reduced dramatically compared with a single metal hybrid, and the safety performance greatly improved.

DETAILED DESCRIPTION

The present disclosure will be described in further details in combination with the drawings and specific examples:

The general structure formula of the graphene/metal or semi-metal composite material with shell-core structure of the present disclosure is shown below:
(R-GO)M, wherein R is a surface modified functional group, GO is graphene oxide, M is a metal or a semi-metal, M is the core of the shell-core structure, R-GO is the shell of the shell-core structure.

The preparation method of a graphene/metal or semi-metal composite material with shell-core structure of the present disclosure comprises the following steps:

step 1), modifying graphene oxide, introducing a surface functional group to graphene oxide to obtain a modified graphene oxide, wherein the surface functional group includes amine group, hydroxylamine group, acyl group, amide group or epoxy group. The specific method of modifying graphene oxide comprises the following steps:

1.1) subjecting an aqueous solution of graphene oxide to ultrasonic dispersion and stirring homogeneously to obtain a clear solution, the concentration of the solution of graphene oxide-water is 0.5 to 10 mg/ml;

1.2) slowly dropping a modifier into the clear solution of graphene oxide, stirring and refluxing; controlling the reaction temperature, dropping rate and refluxing time to obtain a modified graphene oxide solution, wherein the modifier is ethylenediamine, hexamethylenediamine, triethanolamine, diethanolamine, N,N-diethylhydroxylamine, N-acetylpiperidine, N-acetylpiperazine, dimethylformamide, isopentanamide, acetamide, ethylene oxide or propylene oxide, and the mass ratio of the modifier to graphene oxide is 1:5 to 1:20. The above-mentioned dropping rate is 10 to 80 drops/min. The reaction temperature is 20 to 80° C., and the refluxing time is 1 to 5 h;

1.3) subjecting the modified graphene oxide solution to high speed centrifugation and filtration to obtain a modified graphene oxide gel-like product. The time of the high speed centrifugation is 5-30 min, and the speed of the centrifugation is 4000 to 8000 r/min;

1.4) after washing the modified graphene oxide gel-like product, vacuum drying is performed to obtain a powder of the modified graphene oxide. The vacuum drying temperature is 60 to 120° C., and the vacuum drying time is 5 to 24 h;

step 2), dissolving the modified graphene oxide in an organic solvent to obtain an organic solution of the modified graphene oxide after ultrasonic dispersion. The concentration of the organic solution is 0.5 to 10 mg/ml, and the organic solvent is ethanol, acetone, tetrahydrofuran, ethyl acetate, diethyl ether or dimethylformamide;

step 3), placing a metal or a semi-metal in a 3-neck round-bottom flask, followed by adding an appropriate amount of organic solvent, which is the same as the organic solvent of the modified graphene oxide solution. After stirring homogeneously, the organic solution of the modified graphene oxide is slowly dropped into it. When reacting for a period of time, a brownish black solution of a coated graphene/metal (semi-metal) is obtained; the mass ratio of the metal or semi-metal to the modified graphene oxide is 2000:1 to 100:1; the reaction temperature is −10° C. to +80° C.; the reaction time is 1 to 10 h; the dropping rate of the organic solution of the modified graphene oxide is 10 drops/min to 100 drops/min;

wherein, the metal is Ni, Zn, Al, Mg, Zr, Fe, Ag, Pt or Au; the semi-metal is a metal hydride, an intermetallic compound or a metal oxide; the metal hydride is $MgH_2$, $AlH_3$, $Mg(BH_4)_2$ or LiH; the intermetallic compound is B—Mg, B—Al, Zr—Al or Al—Mg; and the metal oxide is $Fe_2O_3$, $TiO_2$, $P_2O_3$, MgO, CuO or $Al_2O_3$;

step 4), subjecting the solution of the coated graphene/metal or semi-metal to suction filtration to obtain a coated composite material of graphene/metal or semi-metal, wherein the time of the suction filtration is 3 to 15 min; then placing the product after the suction filtration in a vacuum drying oven and subjecting it to vacuum heat preservation for a period of time; the temperature of the vacuum heat preservation is 10 to 100° C. and the time of the vacuum heat preservation is 0.5 to 10 h, a dried graphene/metal (semi-metal) composite material with shell-core structure is obtained.

Example 1

Step 1): According to the surface state of active metal Al (containing $Al_2O_3$ thin layer covering), grafting hydroxylamine group onto the surface of graphene oxide was designed to obtain hydroxylamine-modified graphene oxide (NHOH-GO). The specific process steps were as follows:

1.1) an aqueous solution of graphene oxide with a concentration of 10 mg/ml was prepared, placed in a 3-neck flask and subjected to ultrasound dispersion and stirring until the solution was clear;

1.2) according to the designed hydroxylamine functional group, N,N-diethylhydroxylamine was selected as the modifier; N,N-diethylhydroxylamine was slowly dropped into the solution of graphene oxide, stirred and refluxed for a period of time; wherein the mass ratio of N,N-diethylhydroxylamine to graphene oxide was 1:5; the reaction temperature was controlled to be 50° C.; the dropping rate was controlled to be 45 drops/min; the refluxing time was 1 h, the solution of hydroxylamine-modified graphene oxide was obtained;

1.3) the solution of hydroxylamine-modified graphene oxide was subjected to a centrifugation at a speed of 8000 r/min for 5 minutes; after filtration, a gel-like product of hydroxylamine-modified graphene oxide was obtained;

1.4) after the above-mentioned gel-like product was washed for 5 to 6 times, it was placed in a vacuum drying oven at 120° C. and was dried for 5 hours to obtain a dark brown powder of hydroxylamine-modified graphene oxide.

Figure 3:
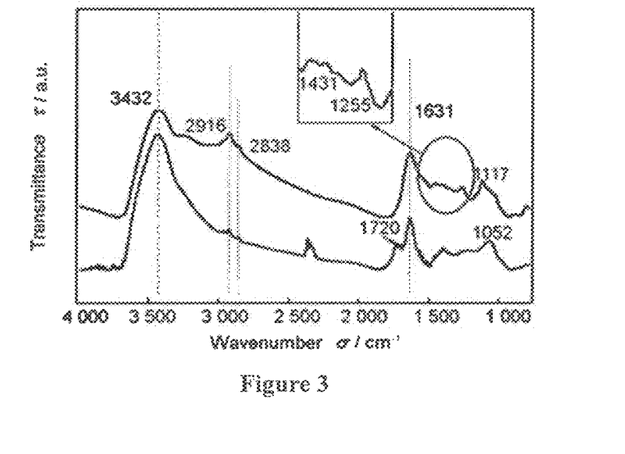
FIG. 3 is the infrared spectrum of the hydroxylamine-modified graphene oxide obtained in Example 1 (Example 9) of the present disclosure.

FIG. 3 shows the infrared spectrum of the hydroxylamine-modified graphene oxide obtained in Example 1 of the present disclosure. As shown in the figure, compared with the infrared spectrum of graphene oxide, there are new characteristic peaks shown at 1431 cm$^{-1}$ and 1255 cm$^{-1}$ of the infrared spectrum of hydroxylamine-modified graphene oxide, corresponding to the —OH bending vibration in hydroxylamine, and the characteristic peak at 3430 cm$^{-1}$ also contains —NH stretching vibration, demonstrating that the obtained product was hydroxylamine-modified graphene oxide.

Step 2): The powder of hydroxylamine-modified graphene oxide was dissolved into tetrahydrofuran, after ultrasonic dispersion, a solution of hydroxylamine-modified graphene oxide in tetrahydrofuran with a concentration of 3 mg/ml was obtained.

Step 3): Al powder was placed in a 3-neckround-bottom flask; an appropriate amount of tetrahydrofuran was added and stirred until homogeneous; the tetrahydrofuran solution of hydroxylamnine-modified graphene oxide was slowly dropped into it at a speed of 30 drops/min at 30° C.; wherein the mass ratio of Al to hydroxylamine-modified graphene oxide was 800:1; a brownish black solution of coated graphene/Al was obtained after 4 h of dropping for reaction.

Step 4): The solution of coated graphene/Al was subjected to suction filtration for about 8 min, and then a coated graphene/Al was obtained; the coated graphene/Al after the suction filtration was placed in a 40° C. vacuum drying oven for a 5 h vacuum heat preservation to obtain a dried graphene/Al composite material with shell-core structure.

The specific structure formula is (NHOH-GO)—Al.

Figure 1:
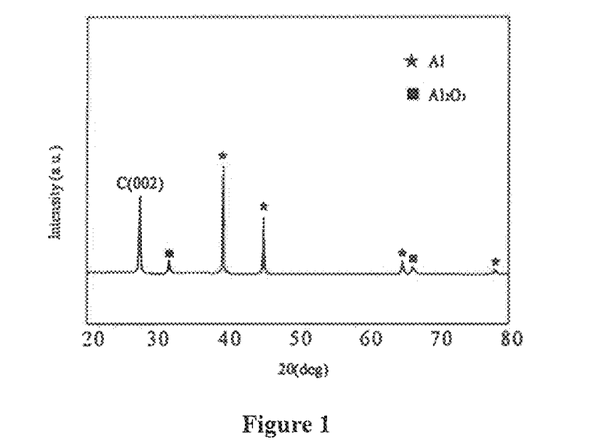
FIG. 1 is the XRD pattern of the graphene-Al composite material with shell-core structure in Example 1 of the present disclosure.

FIG. 1 shows the XRD pattern of the graphene-Al composite material with shell-core structure in Example 1 of the present disclosure. As shown in the figure, the graphene-Al composite material with shell-core structure has X-ray diffraction characteristic peaks of C and Al, wherein the C peak corresponds to the structural characteristic of graphene (the same in the detection results of the XRD patterns in the following examples); there are a few characteristic peaks of $Al_2O_3$ at the same time, which was mainly because a thin layer of $Al_2O_3$ was formed after the surface of the Al powder was oxidized.

Figure 2:
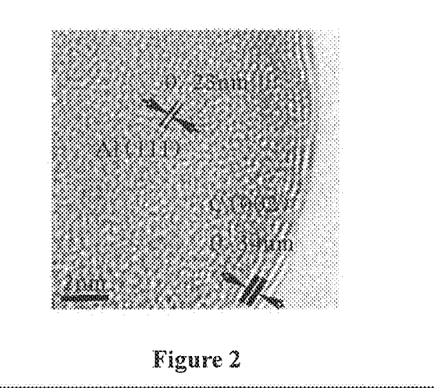
FIG. 2 is the TEM image of the graphene-Al composite material with shell-core structure in Example 1 of the present disclosure.

FIG. 2 shows the TEM image of the graphene-Al composite material with shell-core structure in Example 1 of the present disclosure. As shown in the figure, the "shell" of the material was a graphene layer with a thickness of about 0.34 nm, while the "core" was Al with a lattice constant of 0.23 nm, showing that a graphene-Al composite material with shell-core structure was obtained in the present disclosure.

The combustion heat of the prepared graphene-Al shell-core composite material with a shell-core structure in the example was 5.2% higher than that of pure Al powder and the residual rate was ≤1.8%. Compared with the composite solid propellant containing pure Al powder, the actual specific impulse of the composite solid propellant containing 12% graphene/Al shell-core composite material with shell-core structure increased by 2.8%.

Example 2

Step 1): According to the surface state of active metal Ni (containing NiO thin layer covering), grafting amine group onto the surface of graphene oxide was designed to obtain amine-modified graphene oxide ($NH_2$-GO). The specific process steps were as follows:

1.1) an aqueous solution of graphene oxide with a concentration of 3 mg/ml was prepared, placed in a 3-neck flask and subjected to ultrasound and stirring until the solution was clear;

1.2) ethylenediamine, the modifier, was slowly dropped into the clear solution of graphene oxide, stirred and refluxed for a period of time; wherein the mass ratio of ethylenediamine to graphene oxide was 1:10; the reaction temperature was controlled to be 40° C.; the dropping rate was 20 drops/min; the refluxing time was 4 h, a solution of amine-modified graphene oxide was obtained;

1.3) the solution of amine-modified graphene oxide was subjected to a centrifugation at a speed of 5000 r/min for 20 minutes; after filtration, a gel-like product of amine-modified graphene oxide was obtained;

1.4) after the above-mentioned gel-like product was washed for 5-6 times, it was placed in a 90° C. vacuum drying oven and was dried for 7 h, a dark brown powder of amine-modified graphene oxide was obtained.

Figure 5:
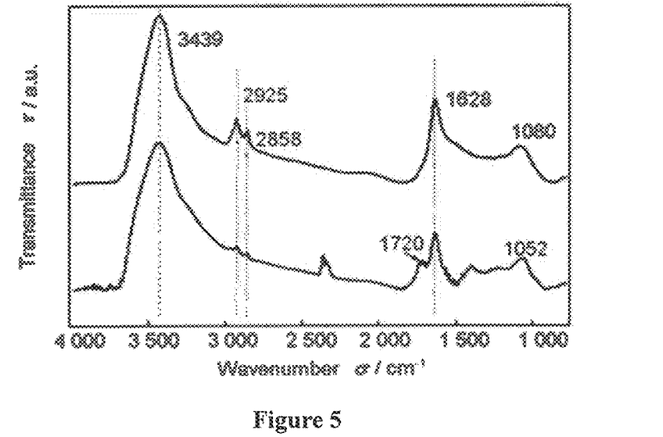
FIG. 5 is the infrared spectrum of the amine-modified graphene oxide obtained in Example 2 (Example 4, Example 6) of the present disclosure.

FIG. 5 shows the infrared spectrum of the amine-modified graphene oxide obtained in Example 2 of the present disclosure. As shown in FIG. 5, compared with GO, the —NH stretching vibration peak of amine-modified graphene oxide at 3300-3500 cm$^{-1}$ was slightly shifted (3439 cm$^{-1}$), the —NH in-plane bending vibration peak at 1650-1500 cm$^{-1}$ was also shifted and enhanced (1628 cm$^{-1}$) at the same time, demonstrating that the sample obtained by the method was amine-modified graphene oxide.

Step 2): The powder of amine-modified graphene oxide was dissolved into tetrahydrofuran, after ultrasonic dispersion, a solution of amine-modified graphene oxide in tetrahydrofuran with a concentration of 1 mg/ml was obtained.

Step 3): Ni powder was placed in a 3-neck round-bottom flask; an appropriate amount of tetrahydrofuran was added and stirred homogeneously; the solution of amine-modified graphene oxide in tetrahydrofuran was slowly dropped into it with a speed of 40 drops/min at 20° C.; wherein the mass ratio of Ni powder to amine-modified graphene oxide was 300:1; a brownish black solution of coated graphene/Ni was obtained after 6 h of dropping reaction.

Step 4): The solution of coated graphene/Ni was subjected to suction filtration which lasted for about 6 min then a coated graphene/Ni was obtained; then the coated graphene/Ni after the suction filtration was placed in a 10° C. vacuum drying oven for a 7 h vacuum drying to obtain a dried graphene/Ni composite material with shell-core structure.

The specific structure formula is ($H_2N$-GO)—Ni.

Figure 4:
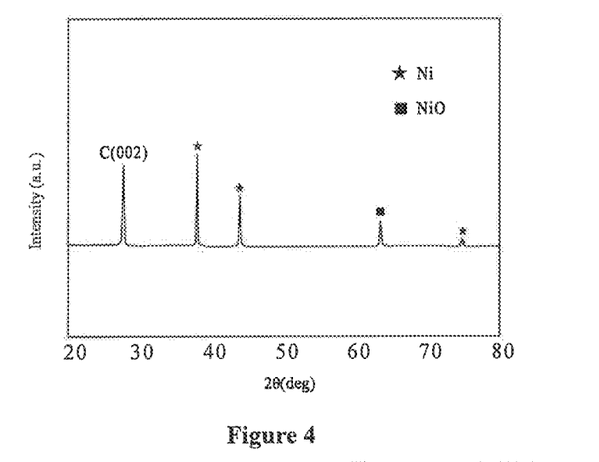
FIG. 4 is the XRD pattern of the graphene-Ni composite material with shell-core structure in Example 2 of the present disclosure.

FIG. 4 shows the XRD pattern of the graphene-Ni composite material with shell-core structure in Example 2 of the present disclosure. As shown in the figure, the graphene-Ni composite material with shell-core structure had X-ray diffraction characteristic peaks of C and Ni; there are also a few characteristic peaks of NiO at the same time, which was mainly because a thin layer of NiO was formed after the surface of Ni powder was oxidized.

In the test, the combustion heat of the prepared graphene-Ni composite material with shell-core structure was 8.0% higher than that of pure Ni powder and the residual rate was ≤1.5%. Compared with a composite solid propellant containing pure Ni powder, the actual specific impulse of a composite solid propellant containing 6% graphene-Ni shell-core composite material with shell-core structure increased by 1.5%.

Example 3

Step 1): According to the surface state of metal hydride $MgH_2$ (containing MgO and $Mg(OH)_2$ thin layer covering), grafting epoxy group onto the surface of graphene oxide was designed to obtain epoxy-modified graphene oxide (—CH(O)CH-GO). The specific process steps were as follows:

1.1) an aqueous solution of graphene oxide with a concentration of 0.5 mg/ml was prepared, placed in a 3-neck flask and subjected to ultrasound and stirring until the solution was clear;

1.2) according to the designed epoxy group functional group, ethylene oxide was selected as the modifier; ethylene oxide was slowly dropped into the solution of graphene oxide, stirred and refluxed for a period of time; wherein the mass ratio of ethylene oxide to graphene oxide was 1:20; the reaction temperature was controlled to be 20° C.; the dropping rate was controlled to be 10 drops/min; the reflux time was 5 h, a solution of epoxy-modified graphene oxide was obtained;

1.3) the solution of epoxy-modified graphene oxide was subjected to a high speed centrifugation at a speed of 6000 r/min for 10 minutes; after filtration, a gel-like product of epoxy-modified graphene oxide was obtained;

1.4) after the above-mentioned gel-like product was washed 5-6 times, it was placed in a vacuum drying oven at 80° C. and was dried for 18 h to obtain a dark brown powder of epoxy-modified graphene oxide.

Figure 7:
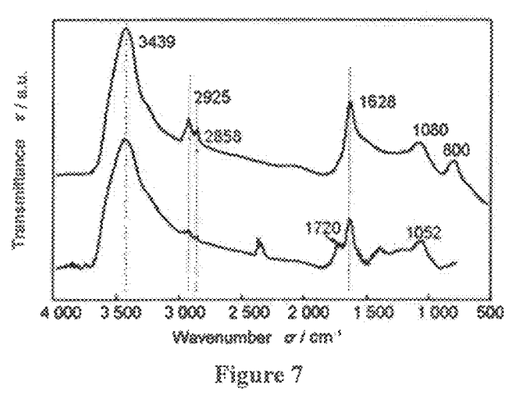
FIG. 7 is the infrared spectrum of the epoxy-modified graphene oxide obtained in Example 3 of the present disclosure.

FIG. 7 shows the infrared spectrum of the epoxy-modified graphene oxide obtained in Example 3 of the present disclosure. As shown in the figure, a new characteristic peak of epoxy was produced by the modified graphene oxide at 800 $cm^{-1}$, demonstrating that the epoxy group was grafted successfully onto the surface of graphene oxide.

Step 2): The powder of epoxy-modified graphene oxide was dissolved into diethyl ether, after ultrasonic dispersion. The solution of epoxy-modified graphene oxide in diethyl ether with a concentration of 0.5 mg/ml was obtained.

Step 3): $MgH_2$ powder was placed in a 3-neck round-bottom flask; an appropriate amount of diethyl ether was added and stirred until homogeneous; the solution of epoxy-modified graphene oxide in diethyl ether was slowly dropped into it at a speed of 70 drops/min at −10° C.; wherein the mass ratio of $MgH_2$ to epoxy-modified graphene oxide was 2000:1; a brownish black solution of coated graphene/$MgH_2$ was obtain after 3 h of dropping reaction.

Step 4): The solution of coated graphene/$MgH_2$ was subjected to suction filtration for about 10 min then a coated graphene/$MgH_2$ was obtained; then the coated graphene/$MgH_2$ after the suction filtration was placed in a vacuum drying oven at 10° C. for a 10 h vacuum heat preservation to obtain a dried graphene/$MgH_2$ composite material with shell-core structure.

The specific structure formula is [—CH(O)CH-GO]—$MgH_2$.

Figure 6:
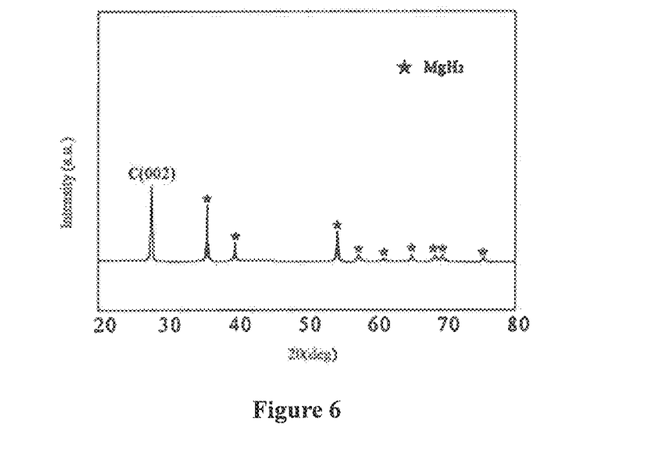
FIG. 6 is the XRD pattern of the graphene-$MgH_2$ composite material with shell-core structure in Example 3 of the present disclosure.

FIG. 6 shows the XRD pattern of the graphene-$MgH_2$ composite material with shell-core structure in Example 3 of the present disclosure. As shown in the figure, the graphene-$MgH_2$ composite material with shell-core structure had notable X-ray diffraction characteristic peaks of C and $MgH_2$; no characteristic peak of Mg or MgO was detected.

In the test, for $MgH_2$ itself, it had a friction sensitivity of 100%, an impact sensitivity >49 J, a loss of gravity on heating ≥0.8% at 100° C. The friction sensitivity for the mixture system mixed with GAP binder was 100%, and the impact sensitivity was about 2 J; for the prepared graphene/$MgH_2$ composite material with shell-core structure, it had a friction sensitivity of 56%, an impact sensitivity >49 J, a loss of gravity on heating ≤0.4% at 100° C. The friction sensitivity for the mixture system mixed with GAP binder was 79%, and the impact sensitivity was 8.3 J.

Example 4

Step 1): According to the surface state of metal oxide $Fe_2O_3$, grafting amine group onto the surface of graphene oxide was designed to obtain amine-modified graphene oxide ($H_2N$-GO). The preparation method was the same as Example 2 and the specific process steps were as follows:

1.1) an aqueous solution of graphene oxide with a concentration of 3 mg/ml was prepared, placed in a 3-neck flask and subjected to ultrasound and stirring until the solution was clear;

1.2) ethylenediamine, the modifier, was slowly dropped into the clear solution of graphene oxide, stirred and refluxed for a period of time, wherein the mass ratio of ethylenediamine to graphene oxide was 1:10; the reaction temperature was controlled to be 40° C.; the dropping rate was 20 drops/min; the reflux time was 4 h, a solution of amine-modified graphene oxide was obtained;

1.3) the solution of amine-modified graphene oxide was subjected to a centrifugation at a speed of 5000 r/min for 20 minutes; after filtration, a gel-like product of amine-modified graphene oxide was obtained;

1.4) after the above-mentioned gel-like product was washed for 5 to 6 times, it was placed in a vacuum drying oven at 90° C. and was dried for 7 h to obtain a dark brown powder of amine-modified graphene oxide.

FIG. 5 shows the infrared spectrum of the amine-modified graphene oxide obtained in Example 4 of the present disclosure, which was the same as that of the amine-modified graphene oxide in Example 2.

Step 2): The powder of amine-modified graphene oxide was dissolved into ethyl acetate, after ultrasonic dispersion, a solution of amine-modified graphene oxide in ethyl acetate with a concentration of 8 mg/ml was obtained.

Step 3): $Fe_2O_3$ powder was placed in a 3-neck round-bottom flask; an appropriate amount of ethyl acetate was added and stirred homogeneously; the solution of amine-modified graphene oxide in ethyl acetate was slowly dropped into it at a speed of 100 drops/min at 80° C., wherein the mass ratio of $Fe_2O_3$ to amine-modified graphene oxide was 500:1, a brownish black solution of coated graphene/$Fe_2O_3$ was obtained after 8 h of dropping reaction.

Step 4): The solution of coated graphene/$Fe_2O_3$ was subjected to suction filtration for about 5 min then a coated graphene/$Fe_2O_3$ was obtained; and then the coated graphene/$Fe_2O_3$ after the suction filtration was placed in a vacuum drying oven at 100° C. for a 2 h vacuum heat preservation to obtain a dried graphene/$Fe_2O_3$ composite material with shell-core structure.

The specific structure formula is ($H_2N$-GO)—$Fe_2O_3$.

Figure 8:
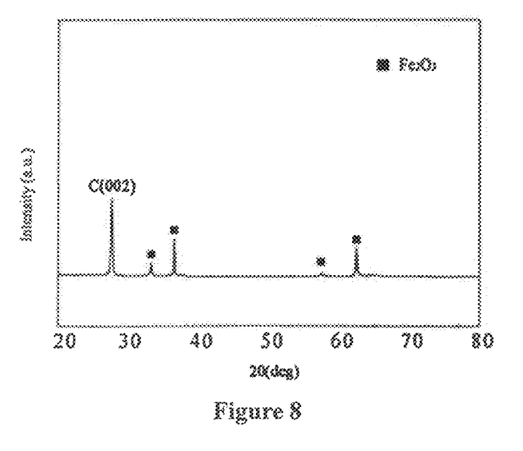
FIG. 8 is the XRD pattern of the graphene-$Fe_2O_3$ composite material with shell-core structure in Example 4 of the present disclosure.

FIG. 8 shows the XRD pattern of the graphene-$Fe_2O_3$ composite material with shell-core structure in Example 4 of the present disclosure. As shown in the figure, the graphene-$Fe_2O_3$ composite material with shell-core structure had notable X-ray diffraction characteristic peaks of C and $Fe_2O_3$.

In the test, the DSC peak temperature of the prepared graphene/$Fe_2O_3$ composite material with shell-core structure/AP mixture system was 245.3° C., which was 13.8° C. lower than that of $Fe_2O_3$/AP mixture system; compared with the composite solid propellant containing $Fe_2O_3$, under 6.86 MPa, the burning rate of the composite solid propellant containing 1.0% graphene-$Fe_2O_3$ composite material with shell-core structure increased by about 38.8%

Example 5

Step 1): According to the surface state of metal hydride $AlH_3$ (containing $Al_2O_3$ and $Al(OH)_3$ thin layer covering), grafting amide group onto the surface of graphene oxide was designed to obtain amide-modified grapheme oxide ($CONH_2$-GO). The specific process steps were as follows:

1.1) an aqueous solution of graphene oxide with a concentration of 8 mg/ml was prepared, and placed in a 3-neck flask and subjected to ultrasound and stirring until the solution was clear;

1.2) according to the designed amide functional group, acetamide was selected as the modifier; acetamide was slowly dropped into the solution of graphene oxide, stirred and refluxed for a period of time, wherein the mass ratio of acetamide to graphene oxide was 1:15; the reaction temperature was controlled to be 60° C., the dropping rate was controlled to be 35 drops/min, and the refluxing time was 3 h, a solution of amide-modified graphene oxide was obtained;

1.3) the solution of amide-modified graphene oxide was subjected to centrifugation at a speed of 4000 r/min for 30 minutes; after filtration, a gel-like product of amide-modified graphene oxide was obtained; and 1.4) after the above-mentioned gel-like product was washed for 5 to 6 times, it was placed in a vacuum drying oven at 110° C. and was dried for 10 hours to obtain dark brown powder of amide-modified graphene oxide.

Figure 10:
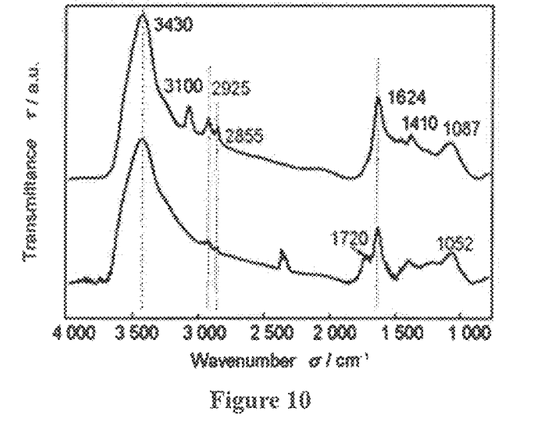
FIG. 10 is the infrared spectrum of the amide-modified graphene oxide obtained in Example 5 (Example 8) of the present disclosure.

FIG. 10 shows the infrared spectrum of the amide-modified graphene oxide obtained in Example 5 of the present disclosure. As shown in the figure, new characteristic peaks appearing at 3100 $cm^{-1}$ and 1410 $cm^{-1}$ belong to amide, showing that the obtained product was amide-modified graphene oxide.

Step 2): The powder of amide-modified graphene oxide was dissolved into tetrahydrofuran, after ultrasonic dispersion, a solution of amide-modified graphene oxide in tetrahydrofuran with a concentration of 2 mg/ml was obtained.

Step 3): $AlH_3$ powder was placed in a 3-neck round-bottom flask; an appropriate amount of tetrahydrofuran was added and stirred until homogeneous; the solution of amide-modified graphene oxide in tetrahydrofuran was slowly dropped into it at a speed of 20 drops/min at 0° C., wherein the mass ratio of $AlH_3$ to amide-modified graphene oxide was 1500:1; a brownish black solution of coated graphene/$AlH_3$ was obtained after 3 h of dropping for reaction.

Step 4): The solution of coated graphene/$AlH_3$ was subjected to suction filtration for about 15 min then a coated graphene/$AlH_3$ was obtained; then the coated graphene/$AlH_3$ after suction filtration was placed in a vacuum drying oven at 10° C. for a 10 h vacuum heat preservation to obtain a dried graphene/$AlH_3$ composite material with shell-core structure.

The specific structure formula is ($CONH_2$-GO)—$AlH_3$.

Figure 9:
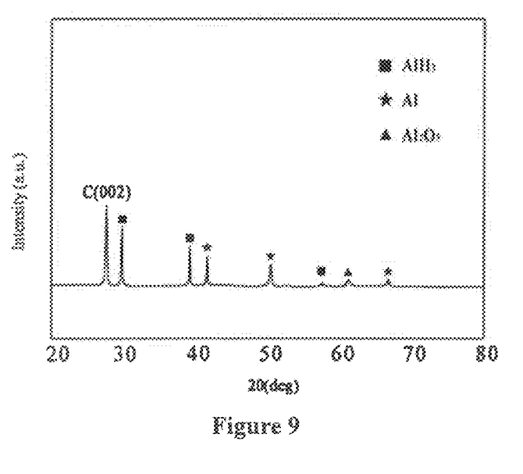
FIG. 9 is the XRD pattern of the graphene-$AlH_3$ composite material with shell-core structure in Example 5 of the present disclosure.

FIG. 9 shows the XRD pattern of the graphene-$AlH_3$ composite material with shell-core structure in Example 5 of the present disclosure. As shown in the figure, the graphene-$AlH_3$ composite material with shell-core structure had X-ray diffraction characteristic peaks of C and $AlH_3$, and there are a few characteristic peaks of Al and $Al_2O_3$ at the same time, which was mainly because the stability of $AlH_3$ was poor and slow decompositions were readily to occur, and the surface thereof was readily to be oxidized to form a thin layer of $Al_2O_3$.

After test, $AlH_3$ itself had a friction sensitivity of 80%, an impact sensitivity >49 J, and a loss of gravity on heating ≥2.5% at 100° C.; for the mixture system mixed with GAP binder, the friction sensitivity was 100%, and the impact sensitivity was 1.5 J. After test, the prepared graphene/$AlH_3$ composite material with shell-core structure had a friction sensitivity of 38%, an impact sensitivity >49 J, and a loss of gravity on heating ≤0.5% at 100° C.; for the mixture system mixed with GAP adhesive, the friction sensitivity was 68%, the impact sensitivity was 6.8 J. The stability was improved significantly.

Example 6

Step 1): According to the surface state of active metal Mg (containing MgO mixture thin layer covering), grafting amine group onto the surface of graphene oxide was designed to obtain amine-modified graphene oxide ($NH_2$-GO). The preparation method was the same as Example 2 and the specific process steps were as follows:

1.1) a solution of graphene oxide-water with a concentration of 3 mg/ml was prepared, placed in a 3-neck flask and subjected to ultrasound and stirring until the solution was clear;

1.2) ethylenediamine, the modifier, was slowly dropped into the clear solution of graphene oxide, stirred and refluxed for a period of time, wherein the mass ratio of ethylenediamine to graphene oxide was 1:10, the reaction temperature was controlled to be 40° C., the dropping rate was 20 drops/min, and the refluxing time was 4 h, a solution of amine-modified graphene oxide was obtained;

1.3) the solution of amine-modified graphene oxide was subjected to centrifugation at a speed of 5000 r/min for 20 minutes; after filtration, a gel-like product of amine-modified graphene oxide was obtained;

1.4) after the above-mentioned gel-like product was washed for 5 to 6 times, it was placed in a vacuum drying oven at 90° C. and was dried for 7 hours, a dark brown powder of amine-modified graphene oxide was obtained.

FIG. 5 shows the infrared spectrum of the amine-modified graphene oxide obtained in Example 6 of the present disclosure, which was the same as that of the amine-modified graphene oxide in Example 2.

Step 2): The powder of amine-modified graphene oxide was dissolved in acetone, after ultrasonic dispersion, a solution of amine-modified graphene oxide in acetone with a concentration of 5 mg/ml was obtained.

Step 3): Mg powder was placed in a 3-neck round-bottom flask, to which an appropriate amount of acetone was added and stirred homogeneously, the solution of amine-modified graphene oxide in acetone was slowly dropped into it at a speed of 30 drops/min at 40° C.; wherein the mass ratio of Mg to amine-modified graphene oxide was 1000:1. A brownish black solution of coated graphene/Mg was obtained after 1 h of dropping for reaction.

Step 4): The solution of coated graphene/Mg was subjected to suction filtration for about 10 min, and then a coated graphene/Mg was obtained; then the coated graphene/Mg after suction filtration was placed in a vacuum drying oven at 50° C. for 6 h vacuum drying. A dried graphene/Mg composite material with shell-core structure was obtained.

The specific structure formula is ($NH_2$-GO)—Mg.

Figure 11:
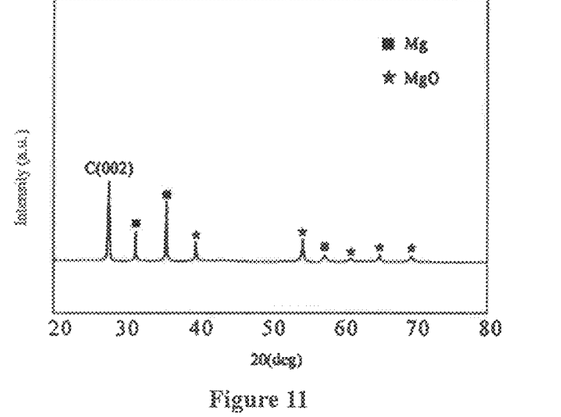
FIG. 11 is the XRD pattern of the graphene-Mg composite material with shell-core structure in Example 6 of the present disclosure.

FIG. 11 shows the XRD pattern of the graphene-Mg composite material with shell-core structure in Example 6 of the present disclosure. As shown in the figure, the graphene-Mg composite material with shell-core structure had X-ray diffraction characteristic peaks of C and Mg and a few characteristic peaks of MgO at the same time, which was mainly because a thin layer of MgO was formed after the surface of Mg powder was oxidized.

The combustion heat of the prepared graphene/Mg shell-core composite material with shell-core structure was measured to be improved by 5.6% as compared with that of pure Mg powder and the residual rate was ≤2%. Compared with a composite solid propellant containing pure Mg powder, the actual specific impulse of the composite solid propellant containing 8% graphene-Mg shell-core composite material with shell-core structure increased by 2.2%.

Example 7

Step 1): According to the surface state of metal oxide PbO, grafting acyl group onto the surface of graphene oxide was designed to obtain acyl-modified graphene oxide ($CH_3$—CO-GO). The specific process steps were as follows:
1.1) An aqueous solution of graphene oxide with a concentration of 6 mg/ml was prepared, placed in a 3-neck flask and subjected to ultrasound and stirring until the solution was clear.
1.2) According to the designed acyl functional group, N-acetylpiperazine was selected as the modifier; N-acetylpiperazine was slowly dropped into the solution of graphene oxide, stirred and refluxed for a period of time, wherein the mass ratio of N-acetylpiperazine to graphene oxide was 1:8, the reaction temperature was controlled to be 80° C., the dropping rate was controlled to be 80 drops/min, and the refluxing time was 4 h. A solution of acyl-modified graphene oxide was obtained.
1.3) The solution of acyl-modified graphene oxide was subjected to centrifugation at a speed of 5000 r/min for 25 min, after filtration, a gel-like product of acyl-modified graphene oxide was obtained.
1.4) After the above-mentioned gel-like product was washed for 5 to 6 times, it was placed in a vacuum drying oven at 60° C. and was dried for 24 h, a dark brown powder of acyl-modified graphene oxide was obtained.

Figure 13:
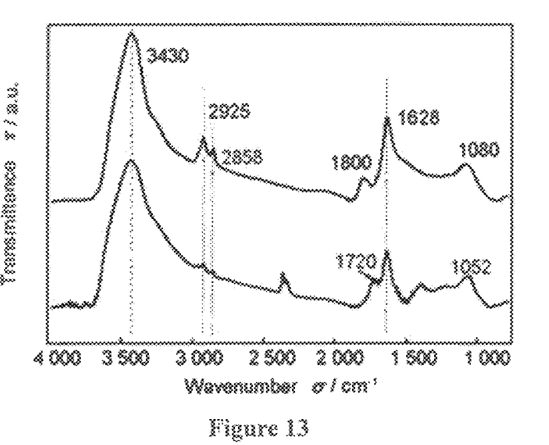
FIG. 13 is the infrared spectrum of the acyl-modified graphene oxide obtained in Example 7 of the present disclosure.

FIG. 13 shows the infrared spectrum of the acyl-modified graphene oxide obtained in Example 7 of the present disclosure. As shown in the figure, there is a new characteristic peak at 1800 $cm^{-1}$, corresponding to acetyl, illustrating that the obtained product was acyl-modified graphene oxide.

Step 2): The powder of acyl-modified graphene oxide was dissolved in dimethylformamide, after ultrasonic dispersion, a solution of acyl-modified graphene oxide in dimethylformamide with a concentration of 3 mg/ml was obtained.

Step 3): PbO powder was placed in a 3-neck round-bottom flask, to which an appropriate amount of dimethylformamide was added and stirred homogeneously, the solution of acyl-modified graphene oxide in dimethylformamide was slowly dropped into it at a speed of 80 drops/min at 80° C., wherein the mass ratio of PbO to acyl-modified graphene oxide was 100:1. A brownish black solution of coated graphene/PbO was obtained after 8 h of dropping for reaction.

Step 4): The solution of coated graphene/PbO was subjected to suction filtration for about 12 min, and then a coated graphene/PbO was obtained. The coated graphene PbO after suction filtration was placed in a vacuum drying oven at 100° C. and was subjected to a 0.5 h vacuum drying. A dried graphene/PbO composite material with shell-core structure was obtained.

The specific structure formula is ($CH_3$—CO-GO)—PbO.

Figure 12:
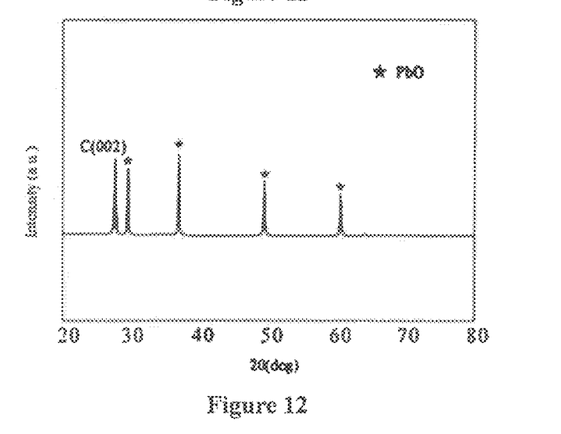
FIG. 12 is the XRD pattern of the graphene-PbO composite material with shell-core structure in Example 7 of the present disclosure.

FIG. 12 shows the XRD pattern of the graphene-PbO composite material with shell-core structure in Example 7 of the present disclosure. As shown in the figure, the graphene-PbO composite material with shell-core structure has notable X-ray diffraction characteristic peaks of C and PbO, corresponding to the structural characteristics of graphene and PbO, respectively.

After test, the DSC peak temperature of the prepared graphene-PbO composite material with shell-core structure/ AP mixture system was 247.8° C., which was 14.2° C. lower than that of PbO/AP mixture system. Compared with the composite solid propellant containing PbO, under 6.86 MPa, the burning rate of the composite solid propellant containing 1.5% graphene/PbO composite material with shell-core structure increased by about 46.5%.

Example 8

Step 1): According to the surface state of intermetallic compound Al—Mg (containing $Al_2O_3$ and MgO thin layer covering), grafting amide group onto the surface of graphene oxide was designed to obtain amide-modified graphene oxide ($CONH_2$-GO). The preparation method was the same as Example 5 and the specific process steps were as follows.
1.1) An aqueous solution of graphene oxide with a concentration of 8 mg/ml was prepared, placed in a 3-neck flask and subjected to ultrasound and stirring until the solution was clear.
1.2) According to the designed amide functional group, acetamide was selected as the modifier. Acetamide was slowly dropped into the solution of graphene oxide, stirred and refluxed for a period of time, wherein the mass ratio of acetamide to graphene oxide was 1:15, the reaction temperature was controlled to be 60° C., the dropping rate was controlled to be 35 drops/min, and the refluxing time was 3 h. A solution of amide-modified graphene oxide was obtained.
1.3) The solution of amide-modified graphene oxide was subjected to centrifugation at a speed of 4000 r/min for 30 min; after filtration, a gel-like product of amide-modified graphene oxide was obtained.
1.4) After the above-mentioned gel-like product was washed for 5 to 6 times, it was placed in a vacuum drying oven at 110° C. and was dried for 10 h to obtain a dark brown powder of amide-modified graphene oxide.

FIG. 10 shows the infrared spectrum of the amide-modified graphene oxide obtained in Example 8 of the present disclosure, which is the same as that of the amide-modified graphene oxide in Example 5.

Step 2): The powder of amide-modified graphene oxide was dissolved into ethyl acetate, after ultrasonic dispersion, a solution of amide-modified graphene oxide in ethyl acetate with a concentration of 6 mg/ml was obtained.

Step 3): Al—Mg powder was placed in a 3-neck round-bottom flask, to which an appropriate amount of ethyl acetate was added and stirred homogeneously; the solution of amide-modified graphene oxide in ethyl acetate was slowly dropped into it at a speed of 10 drops/min at 70° C., wherein the mass ratio of Al—Mg to amide-modified graphene oxide was 500:1. A brownish black solution of coated graphene/Al—Mg was obtained after 10 h of dropping for reaction.

Step 4): The solution of coated graphene/Al—Mg was subjected to suction filtration for about 3 min then a coated graphene/Al—Mg was obtained. The coated graphene/Al—Mg after suction filtration was placed in a vacuum oven at 80° C. for a 3 h vacuum drying, and a dried graphene/Al—Mg composite material with shell-core structure was obtained.

The specific structure formula is ($CONH_2$-GO)—(Al—Mg).

Figure 14:
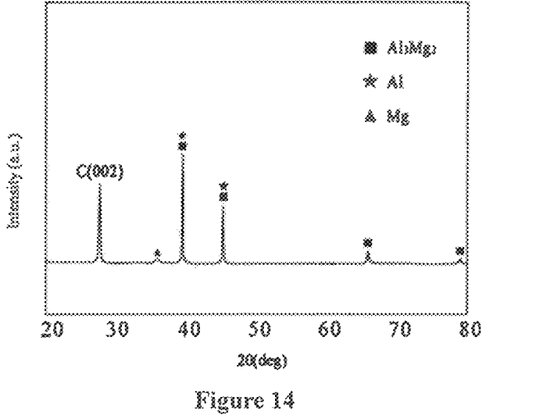
FIG. 14 is the XRD pattern of the graphene-(Al—Mg) composite material with shell-core structure in Example 8 of the present disclosure.

FIG. 14 shows the XRD pattern of the graphene-(Al—Mg) composite material with shell-core structure in Example 8 of the present disclosure. As shown in the figure, the graphene-(Al—Mg) composite material with shell-core structure mainly had X-ray diffraction characteristic peaks of C, Al$_3$Mg$_2$ and Al; meanwhile, there were a few characteristic peaks of Mg at the same time, which was mainly because intermetallic compound Al$_3$Mg$_2$ was readily to be formed between the two metals Al—Mg, and at the same time a part of Al and Mg was also contained.

After test, compared with pure Al—Mg alloy powder, the combustion heat of the prepared graphene/(Al—Mg) shell-core composite material with shell-core structure was improved by 6.0% and the residual rate was ≤1.7%. Compared with the composite solid propellant containing pure Al powder, the actual specific impulse of the composite solid propellant containing 12% graphene/(Al—Mg) composite material with shell-core structure increased by 2.4%.

Example 9

Step 1): According to the surface state of metal oxide CuO, grafting hydroxylamine group onto the surface of graphene oxide was designed to obtain hydroxylamine-modified graphene oxide (NHOH-GO). The preparation method was the same as Example 1 and the specific process steps were as follows.
1.1) An aqueous solution of graphene oxide with a concentration of 10 mg/ml was prepared, placed in a 3-neck flask and subjected to ultrasound and stirring until the solution was clear.
1.2) According to the designed hydroxylamine functional group, NA, N-diethylhydroxylamine was selected as the modifier. N,N-diethylhydroxylamine was slowly dropped into the solution of graphene oxide, stirred and refluxed for a period of time, wherein the mass ratio of N,N-diethylhydroxylamine to graphene oxide was 1:5, the reaction temperature was controlled to be 50° C., the dropping rate was controlled to be 45 drops/min, and the refluxing time was 1 h. A solution of hydroxylamine-modified graphene oxide was obtained.
1.3) The solution of hydroxylamine-modified graphene oxide was subjected to centrifugation at a speed of 8000 r/min for 5 minutes, after filtration, a gel-like product of hydroxylamine-modified graphene oxide was obtained.
1.4) After the above-mentioned gel-like product was washed for 5 to 6 times, it was placed in a vacuum drying oven at 120° C. and was dried for 5 h to obtain a dark brown powder of hydroxylamine-modified graphene oxide.

FIG. 3 shows the infrared spectrum of the hydroxylamine-modified graphene oxide obtained in Example 9 of the present disclosure, which is the same as that of the hydroxylamine-modified graphene oxide in Example 1.

Step 2): The powder of hydroxylamine-modified graphene oxide was dissolved into ethanol, after ultrasonic dispersion, a solution of hydroxylamine-modified graphene oxide in ethanol with a concentration of 10 mg/ml was obtained.

Step 3): CuO powder was placed in a 3-neck round-bottom flask, to which an appropriate amount of ethanol was added and stirred homogeneously; the solution of hydroxylamine-modified graphene oxide in ethanol was slowly dropped into it at a speed of 75 drops/min at 50° C., wherein the mass ratio of CuO to hydroxylamine-modified graphene oxide was 1500:1. A brownish black solution of coated graphene/CuO was obtained after 2 h of dropping for reaction.

Step 4): The solution of coated graphene/CuO was subjected to suction filtration for about 10 min then a coated graphene/CuO was obtained. The coated graphene/CuO after suction filtration was placed in a vacuum drying oven at 90° C. for a 6 h vacuum drying. A dried graphene/CuO composite material with shell-core structure was obtained.

The specific structure formula is (NHOH-GO)—CuO.

Figure 15:
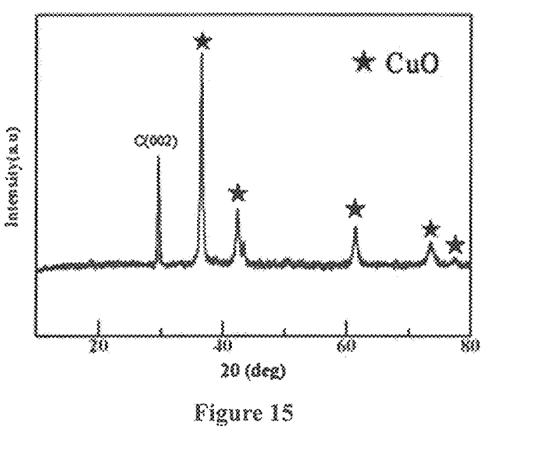
FIG. 15 is the XRD pattern of the graphene-CuO composite material with shell-core structure in Example 9 of the present disclosure.

FIG. 15 shows the XRD pattern of the graphene-CuO composite material with shell-core structure in Example 9 of the present disclosure. As shown in the figure, the graphene-CuO composite material with shell-core structure had notable X-ray diffraction characteristic peaks of C and CuO, corresponding to the structural characteristics of graphene and CuO, respectively.

After test, the DSC peak temperature of the prepared graphene/CuO composite material with shell-core structure/ AP mixture system was 249.2° C., which was 13.9° C. lower than that of CuO/AP mixture system. Compared with a composite solid propellant containing CuO, under 6.86 MPa, the burning rate of a composite solid propellant containing 1.5% graphene-CuO composite material with shell-core structure increased by about 34.5%.

The above is merely the best specific embodiments of the present disclosure while the scope of the present disclosure is not limited thereto. Within the technical scope disclosed by the present disclosure, any replacements and modifications which are easily to be conceived by a person of ordinary skill in the art should be within the scope of protection of the present disclosure.

The contents not described in detail in the specification of the present disclosure belong to commonly-known technology of a person skilled in the art.

The invention claimed is:

1. A method for preparing a graphene/metal or semi-metal composite material with shell-core structure, comprising following steps:
   1) introducing a surface functional group to graphene oxide to obtain a modified graphene oxide;
   2) dissolving the modified graphene oxide in an organic solvent to obtain an organic solution of the modified graphene oxide;
   3) adding a metal or a semi-metal into an organic solvent, stirring homogeneously, then dropping the organic solution of the modified graphene oxide and reacting to obtain a solution of coated graphene/metal or semi-metal; and
   4) removing solvent from the solution of coated graphene/ metal or semi-metal to obtain a graphene/metal or a semi-metal composite material with shell-core structure after drying.

2. The preparation method of the graphene/metal or semi-metal composite material with shell-core structure according to claim 1, wherein the specific method of introducing surface functional group into graphene oxide to obtain the modified graphene oxide in step 1) comprises following steps:
   1.1) subjecting an aqueous solution of graphene oxide to ultrasonic dispersion and even stirring to obtain a clear solution;
   1.2) dropping a modifier into the clear solution of graphene oxide, stirring and refluxing; controlling reaction temperature, dropping rate and refluxing time to obtain a modified graphene oxide solution; and
   1.3) subjecting the modified graphene oxide solution to high speed centrifugation and filtration to obtain a product of modified graphene oxide.

3. The preparation method of the graphene/metal or semi-metal composite material with shell-core structure according to claim 2, wherein the product of modified graphene oxide of step 1.3) is a gel-like product; after washing the gel-like product, subjecting the gel-like product to vacuum drying to obtain powder of modified graphene oxide.

4. The preparation method of the graphene/metal or semi-metal composite material with shell-core structure according to claim 3, wherein the temperature of the vacuum drying is 60 to 120° C., and the time of the vacuum drying is 5 to 24 h.

5. The preparation method of the graphene/metal or semi-metal composite material with shell-core structure according to claim 2, wherein the concentration of the graphene oxide-water solution in step 1.1) is 0.5 to 10 mg/ml.

6. The preparation method of the graphene/metal or semi-metal composite material with shell-core structure according to claim 2, wherein the modifier in step 1.2) is ethylenediamine, hexamethylenediamine, triethanolamine, diethanolamine, N,N-diethylhydroxylamine, N-acetylpiperidine, N-acetylpiperazine, dimethylformamide, isopentanamide, acetamide, ethylene oxide or propylene oxide.

7. The preparation method of the graphene/metal or semi-metal composite material with shell-core structure according to claim 2, wherein the mass ratio of the modifier to graphene oxide is 1:5 to 1:20.

8. The preparation method of the graphene/metal or semi-metal composite material with shell-core structure according to claim 2, wherein the dropping rate of step 1.2) is 10 to 80 drops/min, the reaction temperature is 20 to 80° C., and the time of reflux is 1 to 5 h.

9. The preparation method of the graphene/metal or semi-metal composite material with shell-core structure according to claim 2, wherein the time of the high speed centrifugation in step 1.3) is 5 to 30 min, and the speed of the centrifugation is 4000 to 8000 r/min.

10. The preparation method of the graphene/metal or semi-metal composite material with shell-core structure according to claim 1, wherein the surface functional group of step 1) is amine group, hydroxylamine group, acyl group, amide group or epoxy group.

11. The preparation method of the graphene/metal or semi-metal composite material with shell-core structure according to claim 1, wherein the organic solvent in step 2) is ethanol, acetone, tetrahydrofuran, ethyl acetate, diethyl ether or dimethylformamide.

12. The preparation method of the graphene/metal or semi-metal composite material with shell-core structure according to claim 1, wherein the concentration of the organic solution of modified graphene oxide obtained in step 2) is 0.5 to 10 mg/ml.

13. The preparation method of the graphene/metal or semi-metal composite material with shell-core structure according to claim 1, wherein the metal in step 3) is Ni, Zn, Al, Mg, Zr, Fe, Ag, Pt or Au.

14. The preparation method of the graphene/metal or semi-metal composite material with shell-core structure according to claim 1, wherein the semi-metal in step 3) is metal hydride, intermetallic compound or metal oxide.

15. The preparation method of the graphene/metal or semi-metal composite material with shell-core structure according to claim 14, wherein the metal hydride is $MgH_2$, $AlH_3$, $Mg(BH_4)_2$ or LiH, the intermetallic compound is B—Mg, Zr—Al or Al—Mg, and the metal oxide is $Fe_2O_3$, $TiO_2$, $P_2O_3$, MgO, CuO or $Al_2O_3$.

16. The preparation method of the graphene/metal or semi-metal composite material with shell-core structure according to claim 1, wherein the mass ratio of the metal or the semi-metal to the modified graphene oxide is 2000:1 to 100:1.

17. The preparation method of the graphene/metal or semi-metal composite material with shell-core structure according to claim 1, wherein reaction temperature in step 3) is −10° C. to +80° C.

18. The preparation method of the graphene/metal or semi-metal composite material with shell-core structure according to claim 1, wherein dropping rate of the organic solution of modified graphene oxide in step 3) is 10 drops/min to 100 drops/min.

19. The preparation method of the graphene/metal or semi-metal composite material with shell-core structure according to claim 1, wherein the time of the reaction in step 3) is 1 to 10 h.

20. The preparation method of the graphene/metal or semi-metal composite material with shell-core structure according to claim 1, wherein the organic solvent added to the metal or the semi-metal in step 3) is the same as the organic solvent in the organic solution of modified graphene oxide.

21. The preparation method of the graphene/metal or semi-metal composite material with shell-core structure according to claim 1, wherein suction filtration is used in step 4) to remove solvent from the solution of coated graphene/metal or semi-metal, and the time of suction filtration is 3 to 15 min.

22. The preparation method of the graphene/metal or semi-metal composite material with shell-core structure according to claim 1, wherein after removing solvent from the solution of coated graphene/metal or semi-metal in step 4), the product is placed in a vacuum drying oven for vacuum drying, the temperature of the vacuum drying is 10 to 100° C. and the time of the vacuum drying is 0.5 to 10 h.

* * * * *